United States Patent
Son et al.

(10) Patent No.: US 8,599,753 B2
(45) Date of Patent: Dec. 3, 2013

(54) APPARATUS AND METHOD FOR RECEIVING/TRANSMITTING DATA IN WIRELESS COMMUNICATION SYSTEM

(75) Inventors: Jung-Bo Son, Daejeon (KR); Sok-Kyu Lee, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 12/970,157

(22) Filed: Dec. 16, 2010

(65) Prior Publication Data

US 2011/0149856 A1    Jun. 23, 2011

(30) Foreign Application Priority Data

Dec. 18, 2009  (KR) .................. 10-2009-0127308
May 19, 2010  (KR) .................. 10-2010-0046942

(51) Int. Cl.
*H04W 4/00*  (2009.01)
(52) U.S. Cl.
USPC ........................................... 370/328

(58) Field of Classification Search
None
See application file for complete search history.

(56) References Cited

U.S. PATENT DOCUMENTS

| 2005/0047384 | A1* | 3/2005 | Wax et al. ............... 370/338 |
| 2007/0099665 | A1* | 5/2007 | Kim et al. ............... 455/561 |
| 2009/0154411 | A1* | 6/2009 | Kikuchi et al. .......... 370/329 |
| 2009/0189812 | A1  | 7/2009 | Xia et al. |

FOREIGN PATENT DOCUMENTS

KR   10-2009-0085405 A   8/2009

* cited by examiner

*Primary Examiner* — Chirag Shah
*Assistant Examiner* — Srinivasa Reddivalam

(57) ABSTRACT

A data receiving apparatus includes a receiving unit configured to receive a beacon packet from at least one base station, a searching unit configured to search an index of a subchannel including an optimal channel state among subchannels allocated to a sector divided through spatial multiplexing based on the base station using the beacon packet, a calculating unit configured to calculate a final back off time by adding a slot time of the subchannel index and a random time, and a transmitting unit configured to include the searched subchannel index in a beacon response packet and transmit the beacon response packet after the calculated final back off time.

20 Claims, 8 Drawing Sheets

Control Frame Format

| TYPE A | TF1 | TF2 | TF3 | SIG | DATA |
| TYPE B | TF1 | TF2 | SIG | TF3 | DATA |
| TYPE C | TF1 | TF3 | SIG | DATA | |

- TF1: AGC Carrier sensing CFO estimation, etc.
- TF2: Omnidirectional trainingsymbol for channel estimation
- TF3: Beamformed raining symbol for channel estimation
- SIG: Frame informationabout beamforming data length|modulationand etc.

Data Frame Format

| TF3-1 | TF3-2 | SIG | DATA |

TF3-1: Beamformed shot training symbol for AGC, Carrier sensing, CFO estimation, etc.

TF3-2: Beamformed long training symbol for channel estimation, etc.

| Subchannel index | Beam direction |
|---|---|
| 0 | A |
| 1 | A |
| 2 | B |
| 3 | B |
| 4 | C |
| 5 | C |
| 6 | D |
| 7 | D |

803

| Subchannel index | Beam direction |
|---|---|
| 0 | A |
| 1 | A |
| 2 | A |
| 3 | A |
| 4 | B |
| 5 | B |
| 6 | B |
| 7 | B |
| 8 | C |
| 9 | C |
| 10 | C |
| 11 | C |
| 12 | D |
| 13 | D |
| 14 | D |
| 15 | D |

804

| Subchannel index | Beam direction |
|---|---|
| 0 | A |
| 1 | B |
| 2 | C |
| 3 | D |
| 4 | A |
| 5 | B |
| 6 | C |
| 7 | D |
| 8 | A |
| 9 | B |
| 10 | C |
| 11 | D |
| 12 | A |
| 13 | B |
| 14 | C |
| 15 | D |

805

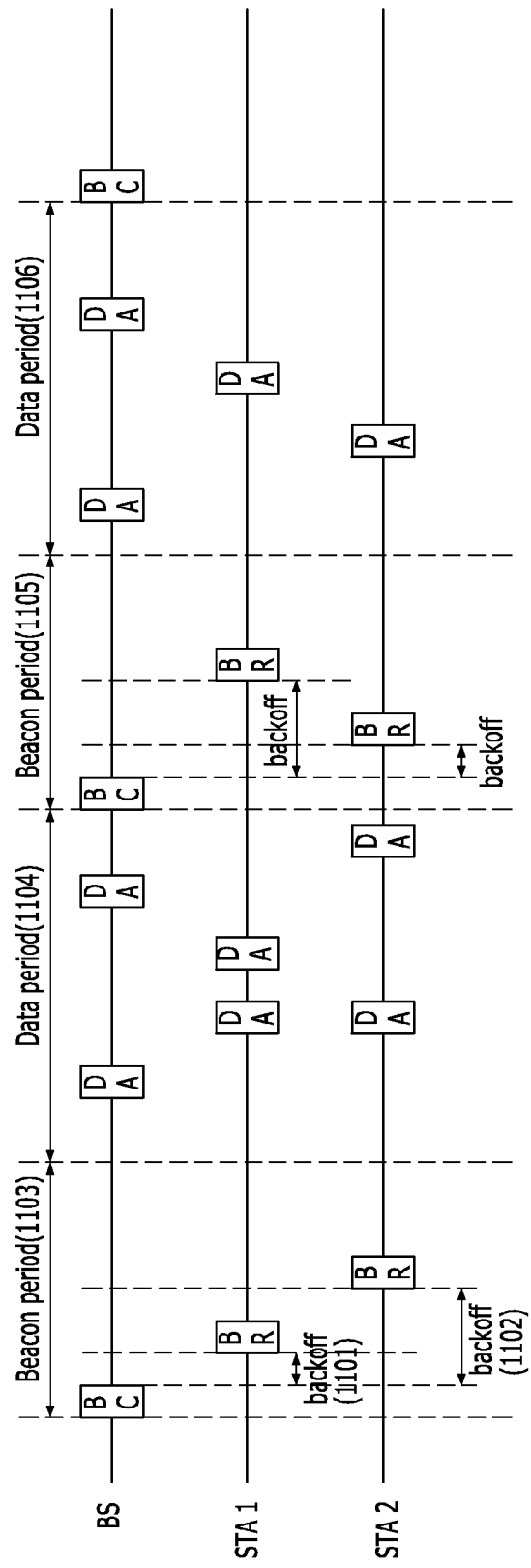

ation System

CROSS-REFERENCES TO RELATED APPLICATIONS

The present application claims priority of Korean Patent Application Nos. 10-2009-0127308 and 10-2010-0046942, filed on Dec. 18, 2009, and May 19, 2010, respectively, which are incorporated herein by reference in their entirety.

BACKGROUND OF THE INVENTION

1. Field of the Invention

Exemplary embodiments of the present invention relate to an apparatus and method for transmitting and receiving data in a wireless communication system; and, more particularly, to an apparatus and method for transmitting and receiving data according to a final back off time by applying a beamforming weight to a subchannel including an optimal channel environment in a wireless communication system.

2. Description of Related Art

A wireless communication system wirelessly connects a plurality of stations in a wireless network and enables them to transmit and to receive data through a wireless link. That is, the plurality of stations load data on a carrier frequency and transmit the data through air. Many wireless networks have been introduced, for example, a local area network (LAN), a personal area network (PAN), and a metropolitan area network (MAN).

Lately, such a wireless communication system has been adapted an orthogonal frequency division multiplexing (OFDM) technology and a multi-antenna technology such as a multiple-input and multiple-output (MIMO) technology. The OFDM technology divides data requiring a high transmit rate into a plurality of data with a low transmit rate and transmits the plurality of data with a low transmit rate at the same time using a plurality of subcarriers.

The MIMO technology improves a data transmission/reception efficiency using multiple transmission antennas and multiple reception antennas. Since a next generation mobile system or a next generation wireless communication system requires transmitting mess amount of data with a high transmit rate, many studies have been made to develop a method for transmitting and receiving data using the MIMO technology. Such a MIMO technology can divide a channel to a plurality of independent channels such as spatial layers or streams according to the number of transmission antennas and reception antennas.

A MIMO system has been used a spatial multiplexing scheme, a spatial diversity scheme, and a beamforming scheme as a data transmission/reception method. The spatial diversity scheme is a technology for transmitting data at a high transmit rate without increasing a system bandwidth by transmitting different data at the same time using multiple transmission antennas. The spatial diversity scheme allows a transmitter to select an optimal path among multiple paths and to transmit data through the selected optimal path to a receiver.

The beamforming scheme is a technology for arranging a plurality of antennas at a regular gap and transmitting the same data by multiplying the data with a weight vector of each antenna. The beamforming scheme advantageously reduces interference to a mobile station located on a direction different from a beam direction of an antenna and increases a signal to interference plus noise ratio (SINR) of a target mobile station with the same power at the same time. However, the beamforming scheme requires association of a transmitter and a plurality of receivers when the transmitter transmits the plurality of receivers. If the association process repeats to transmit data between the transmitter and the receivers, overall time and resources will be wasted.

SUMMARY OF THE INVENTION

An embodiment of the present invention is directed to an apparatus and method for transmitting and receiving data in a multiple-input and multiple-output (MIMO) system.

Another embodiment of the present invention is directed to an apparatus and method for transmitting and receiving data according to a back off time using an antenna having an optimal channel environment among multiple antennas in a multiple-input and multiple-output (MIMO) system.

Still another embodiment of the present invention is directed to an apparatus and method for transmitting and receiving data at a high transmit rate by detecting a transmission/reception direction using an index of a subchannel having an optimal channel environment among multiple antennas in a multiple-input and multiple-output (MIMO) system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for receiving data includes: a receiving unit configured to receive a beacon packet from at least one of a plurality of base stations included in a wireless network having a plurality of stations; a searching unit configured to search an index of a subchannel including an optimal channel state among subchannels allocated to a sector divided through spatial multiplexing based on the base station using the beacon packet; a calculating unit configured to calculate a final back off time by adding a slot time corresponding to the index of the subchannel and a random time generated randomly by the station; and a transmitting unit configured to include information about the searched index of subchannel in a beacon response packet and transmit the beacon response packet after the calculated final back off time.

In accordance with an embodiment of the present invention, a method for receiving data, includes: receiving a beacon packet from at least one of a plurality of base station in a wireless network having a plurality of stations; searching an index of a subchannel having an optimal state among subchannels allocated to a sector divided through spatial multiplexing based on the base station using the beacon packet; calculating a final back off time by adding a slot time corresponding to the index of the subchannel and a random time randomly generated by the station; and including information about the searched index of subchannel in a beacon response packet and transmitting the beacon response packet after the calculated final back off time.

In accordance with an embodiment of the present invention, a method for receiving data, includes: receiving a beacon packet from at least one of a plurality of base station in a wireless network having a plurality of stations; searching an index of a subchannel having an optimal state among subchannels allocated to a sector divided through spatial multiplexing based on the base station using the beacon packet; calculating a final back off time by adding a slot time corresponding to the index of the subchannel and a random time randomly generated by the station; and including information about the searched index of subchannel in a beacon response packet and transmitting the beacon response packet after the calculated final back off time.

In accordance with an embodiment of the present invention, a method for transmitting data, includes: receiving a beacon response packet from at least one of a plurality of stations in a wireless network having a plurality of base station; deciding directions to the plurality of stations using the received beacon response packet; applying beamforming weights as the decided directions to all subchannels allocated to a sector divided through spatial multiplexing based on the base station; and loading data on the weight applied subchannels and transmitting the data to the plurality of stations.

BRIEF DESCRIPTION OF THE DRAWINGS

FIG. 11 is a diagram illustrating a method for transmitting and receiving data by dividing a data transmission/reception period into a beacon period and a data period in a wireless communication system in accordance with an embodiment of the present invention.

DESCRIPTION OF SPECIFIC EMBODIMENTS

Figure 1:
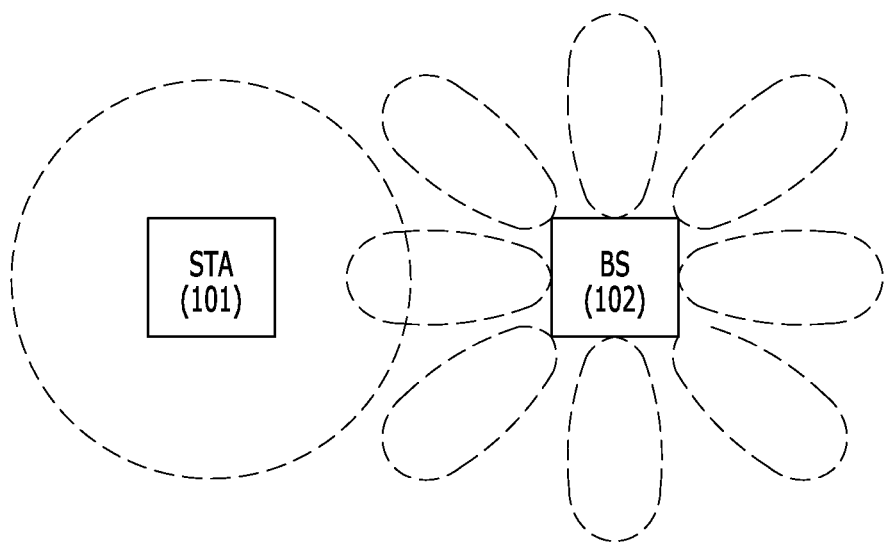
FIG. 1 is a diagram illustrating a typical wireless communication system includes a base station for controlling wireless communication and a station for being connected to the base station and communicating through the base station.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

The present invention relates to an apparatus and method for transmitting and receiving data in a multiple-input and multiple-output (MIMO) system. An embodiment of the present invention relates to an apparatus and method for transmitting and receiving data according to a back off time using an antenna having an optimal channel environment among multiple antennas in a multiple-input and multiple-output (MIMO) system. Another embodiment of the present invention relates to an apparatus and method for transmitting and receiving data at a high transmit rate by detecting a transmission/reception direction using an index of a subchannel having an optimal channel environment among multiple antennas in a multiple-input and multiple-output (MIMO) system. Before describing an apparatus for transmitting/receiving data in a wireless communication system in accordance with an embodiment of the present invention, a typical wireless communication system includes a base station (BS) 102 for controlling wireless communication and a station (STA) 101 for being connected to the BS 102 and communicating through the BS 102.

FIG. 1 is a diagram illustrating a typical wireless communication system includes a BS for controlling wireless communication and an STA for being connected to the BS and communicating through the BS.

Referring to FIG. 1, the typical wireless communication system includes a BS 102 for transmitting a signal and an STA 101 for receiving the signal. The BS 102 uses a plurality of antennas, and the STA 102 use a single antenna.

The BS 102 transmits a sensing signal regularly to maintain connection to the STA 101. The STA 101 transfers information about a wireless channel between the STA 101 and the BS 102 and information about itself to the BS 102. The sensing signal may be included the sensing signal in a predetermined part of a packet transmitted from the BS 102 in order to transmit the sensing signal to the STA 101.

The STA 101 receives a packet from the BS 102. Using a beamforming signal included in the packet, the STA 101 searches an index of a subchannel having an optimal channel state among subchannels allocated to a sector divided through spatial multiplexing based on the BS 102. The STA 101 transmits the searched index of the subchannel having the optimal channel state to the BS 102.

When the BS 102 needs to transmit data to the STA 101 after transmitting the search index of the subchannel, the BS 102 determines a transmission direction using the received index information from the STA 101 and transmits data by applying a beamforming weight to an optimal direction for all OFDM subchannels for the data to be transmitted.

However, the BS 102 cannot determine a data transmission direction because the STA 101 uses the single antenna. Hereinafter, an apparatus for transmitting and receiving data in a wireless communication system in accordance with an embodiment of the present invention will be described with reference to FIG. 2 in detail.

Figure 2:
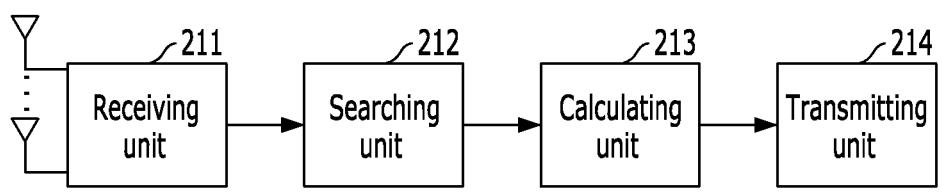
FIG. 2 is a diagram illustrating an apparatus for transmitting and receiving data in a wireless communication system in accordance with an embodiment of the present invention.

FIG. 2 is a diagram illustrating an apparatus for transmitting and receiving data in a wireless communication system in accordance with an embodiment of the present invention.

Referring to FIG. 2, a data receiving apparatus in accordance with an embodiment of the present invention includes a receiving unit 211, a searching unit 212, a calculating unit 213, and a transmitting unit 214. The receiving unit 211 receives a beacon packet (BC) from at least one of a plurality of BSs in a wireless network having a plurality of STAs. Hereinafter, a structure of a BC that the receiving unit 211 receives will be described with reference to FIG. 3.

Figures 3, 4:
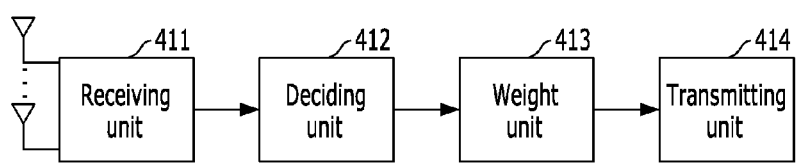
FIG. 3 is a diagram illustrating a structure of a beacon packet that a receiving unit receives in a wireless communication system in accordance with an embodiment of the present invention.
FIG. 4 is a diagram illustrating a data transmission apparatus in a wireless communication system in accordance with an embodiment of the present invention.

FIG. 3 is a diagram illustrating a structure of a BC that a receiving unit receives in a wireless communication system in accordance with an embodiment of the present invention.

Referring to FIG. 3, the BC includes a type A to a type C. However, the BC may include other type in addition to the types A to C. The types A to C may include a TF1 field, a TF2 field, a TF3 field, a SIG field, and a DATA field. The TF2 field stores a first training symbol and the TF3 field stores a second training symbol.

The first training symbol is a symbol transmitted to omni-directions without applying different beamforming weights to subchannels allocated to a plurality of sectors. The second training symbol is a symbol transmitted to a predetermined direction by applying different beamforming weights to subchannels allocated to the plurality of sectors.

The SIG field stores information related to the training symbols stored in the TF2 and TF3 fields and information about a modulation scheme and a length of data stored in the DATA field. The DATA field includes information transmitted from upper layers of a physical layer, and a MAC layer.

Using the BC, the searching unit 212 searches an index of a subchannel having an optimal channel state among subchannels allocated to a sector divided through spatial multiplexing based on the BS. In more detail, the searching unit 212 extracts a channel state of each subchannel without applying different weight thereto using the first training symbol. Also, the searching unit 212 extracts a channel state of each subchannel after applying a different weight thereto using the second training symbol.

The searching unit 212 compares the extracted channel states and searches a subchannel index having the optimal channel state using a signal intensity of a signal received through each subchannel. The calculating unit 213 calculates a final back off time using a sector back off time corresponding to the subchannel index and a random back off time generated by the STA.

The transmitting unit 214 includes the subchannel index information in a beacon response packet (BR) after the final back off time calculated by the calculating unit 213 and transmits the BR to the BS that sent the BC. Here, the calculation of the final back off time in the transmitting unit 214 will be described in detail with reference to Eq. 1.

$$\text{Back off time} = \text{Backoff\_sec} + \text{Backoff\_rad} \quad \text{Eq. 1}$$

Referring to Eq. 1, Back off time denotes the final back off time that the transmitting unit 214 has to wait for transmitting the BR. The final back off time (Back off time) is calculated by adding a sector back off time (Backoff_sec) decided according to an index number of a sector divided through spatial multiplexing based on the BS with a random back off time (Backoff_rad) randomly generated by the calculating unit 213. Hereinafter, the sector back off tie (Backoff_sec) and the random back off time (Backoff_rad) will be described with reference to Eq. 2 and Eq. 3.

$$\text{Backoff\_sec} = \text{sector number} \times \text{backoff sector slot time} \quad \text{Eq. 2}$$

Referring to Eq. 2, sector number denotes an index number a sector divided through spatial multiplexing based on a BS, and backoff sector slot time denotes a minimum time for transmitting and receiving data between the data transmission apparatus and a data reception apparatus.

$$\text{Backoff\_rad} = \text{random number} \times \text{slot time} \quad \text{Eq. 3}$$

Referring to Eq. 3, random number is an integer number randomly generated by the calculating unit 213. The random number is set up to have a maximum value so as not to influence a BR of a sector.

As described above, the calculating unit 213 calculates the final back off time (Back off time). Then, the transmitting unit 214 includes subchannel index information in a BR after the calculated final back off time and transmits the BR to the BS. Here, the subchannel index information indicates an index of a subchannel having an optimal channel state. When a plurality of STAs transmit the beacons response packet signal to the BS at the same time, a reception rate of the BS may be decreased due to collision of the BRs. Accordingly, the transmitting unit 214 transmits the BR after the calculated final back off time (Back off time). Hereinafter, a data transmission apparatus in a wireless communication system in accordance with an embodiment of the present invention will be described with reference to FIG. 4.

FIG. 4 is a diagram illustrating a data transmission apparatus in a wireless communication system in accordance with an embodiment of the present invention.

Referring to FIG. 4, the data transmission apparatus in accordance with an embodiment of the present invention includes a receiving unit 411, a deciding unit 412, a weight unit 413, and a transmitting unit 414. The receiving unit 411 receives a BR from at least one of a plurality of STAs in a wireless network including a plurality of BSs. Using the received BR, the deciding unit 412 decides a subchannel to be used for transmission among subchannels allocated to a sector divided through spatial multiplexing based on a BS. The weight unit 413 applies a beamforming weight to an optimal direction for all OFDM subchannels for data to be transmitted.

The beamforming weight applying process of the weight unit 413 will be described in detail with reference to Eq. 4.

$$x_{mp} = \frac{1}{\sqrt{k}} \sum_{k=0}^{k-1} S_k \times w_{pk} e^{j\frac{2\pi pk}{k}} \; \forall \, n \in [0, k-1] \quad \text{Eq. 4}$$

Referring to Eq. 4, s denotes a signal value per each subchannel, k denotes an index $$e^{j\frac{2\pi pk}{k}}$$

of a subchannel, and n denotes the number of antennas. That is, n is greater than 0 and smaller than an index value of a subchannel −1. w denotes a weight applied to a signal value of each subchannel. P denotes a time. is used to convert a time domain signal to a frequency domain signal.

The transmitting unit 414 loads data on the subchannel with the beamforming weight applied and transmits the data. Hereinafter, a structure of a data transmitted and received after establishing association for data transmission and reception between the data transmission apparatus and the data reception apparatus in accordance with an embodiment of the present invention will be described with reference to FIG. 5.

Figures 5, 6:
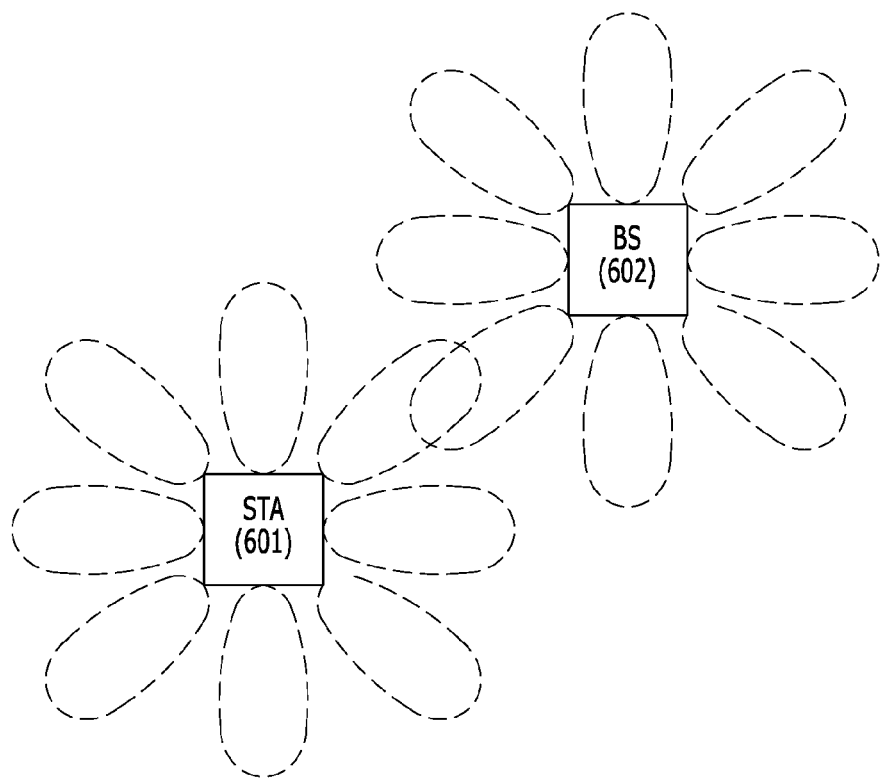
FIG. 5 is a diagram illustrating a structure of a data transmitted and received after establishing association for data transmission and reception between the data transmission apparatus and the data reception apparatus in accordance with an embodiment of the present invention.
FIG. 6 is a diagram illustrating a data transmission and reception process between a base station and a station in a wireless communication system in accordance with an embodiment of the present invention.

FIG. 5 is a diagram illustrating a structure of a data transmitted and received after establishing association fort data transmission and reception between the data transmission apparatus and the data reception apparatus in accordance with an embodiment of the present invention.

Referring to FIG. 5, the data may include a TF3-1 field, a TF3-2 field, a SIG field, and a DATA field. The TF3-1 field includes a short training symbol. The TF3-2 field stores a long training symbol. The SIG field stores information related to the training symbols stored in the TF2 and TF3 fields. The SIG field further stores information about a modulation scheme and a length of data stored in the DATA field. The DATA field includes all information transmitted from upper layers of a physical layer and a MAC layer. Hereinafter, an apparatus for transmitting and receiving data in a wireless communication system in accordance with embodiments of the present will be described in detail.

FIG. 6 is a diagram illustrating a data transmission and reception process between a BS and an STA in a wireless communication system in accordance with an embodiment of the present invention.

Referring to FIG. 6, the wireless communication system includes a BS 602 for transmitting a signal and an STA 601 for receiving the signal. The BS 602 and the STA 601 use a plurality of antennas. The BS 602 transmits a sensing signal regularly to maintain connection to the STA 601. Using the received sensing signal, the STA 601 transfers information about a wireless channel between the BS 602 and the STA 601 and about itself to the BS 602. The sensing signal may be included in a part of a packet transmitted to the BS 602 and transmitted to the STA 601.

The BS 602 transmits a packet to the STA 601. Using the information included in the received packet, the STA 601 searches an index of a subchannel having an optimal channel state among subchannels allocated to a predetermine sector divided through spatial multiplexing based on the BS 602.

The STA 601 transmits the searched subchannel index having the optimal channel state to the BS 602. When the BS 602 needs to transmit data to the STA 601 after receiving the subchannel index from the STA 601, the BS 602 decides a data transmission direction based on the received subchannel index and transmits data by applying a beamforming weight to an optimal direction for all OFDM subchannels for data to be transmitted.

Figure 7:
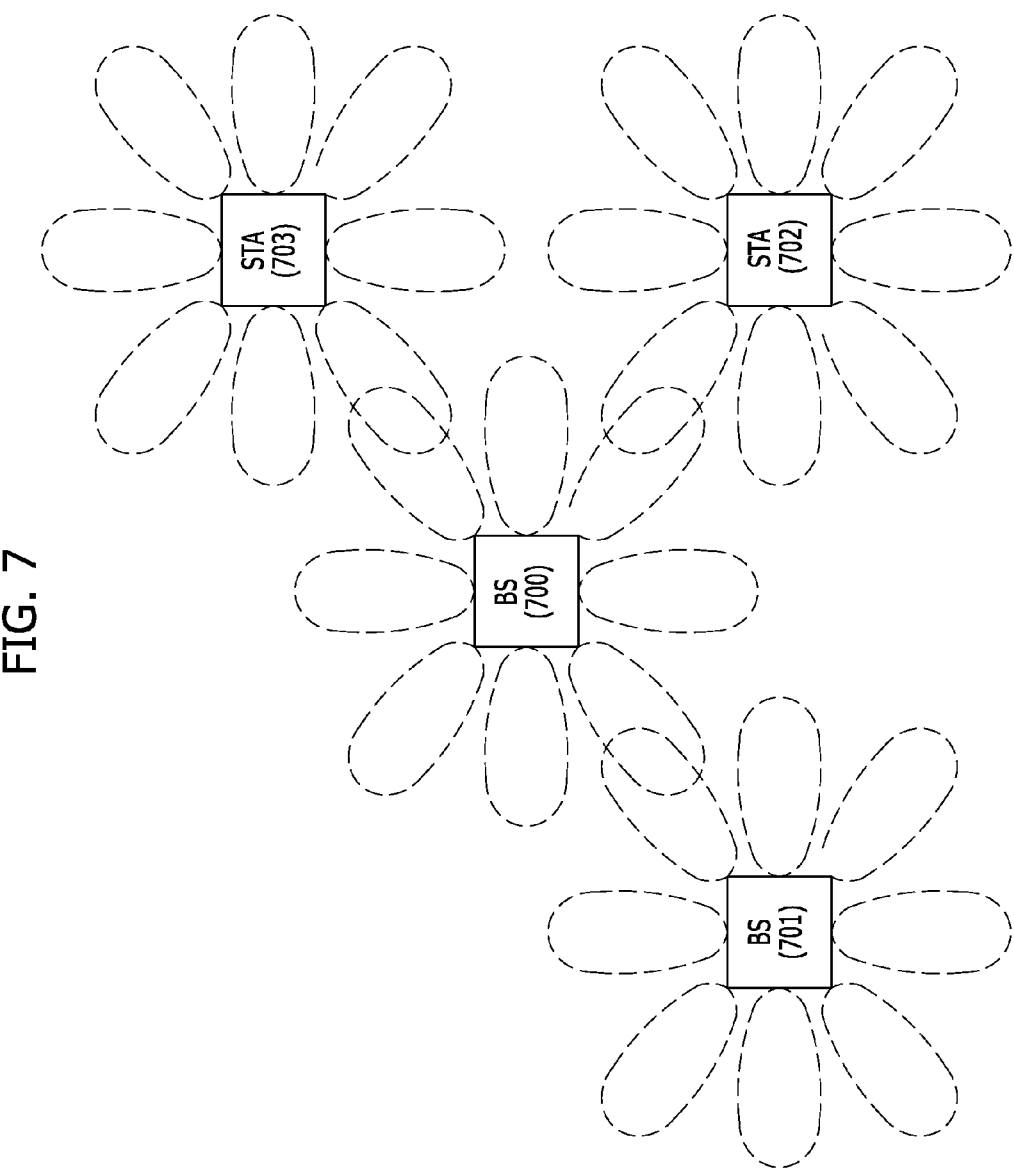
FIG. 7 is a diagram illustrating a wireless communication system includes a base station and a plurality of stations in accordance with an embodiment of the present invention.

FIG. 7 is a diagram illustrating a wireless communication system includes a BS and a plurality of STAs in accordance with an embodiment of the present invention. For convenience, the wireless communication system in accordance with an embodiment of the present invention is described to have one BS and three STAs in FIG. 7. However, there is no limitation in the number of BSs and STAs.

The BS 700 and the STAs 701, 702, and 703 include multiple antennas. The BS 700 transmits a sensing signal regularly in order to maintain connection to the STAs 701, 702, and 703. The STAs 701, 702, and 703 transfer information about a wireless channel to the BS 700 and about itself to the BS 700 using the received sensing signal. The sensing signal may be included in a predetermined part of a packet transmitted from the BS 700 and transmitted to the STAs 701, 702, and 703.

The BS 700 transmits packet to the STAs 701, 702, and 703.

The STAs 701, 702, and 703 extract a channel state of each subchannel without a different weight applied using a first training symbol included in the packet and extracts a channel state of each subchannel with a different weight applied using the second training symbol included in the packet. The STAs 701, 702, and 703 compare the extracted channel states and search a subchannel index having an optimal channel station using a signal intensity of a signal received through each subchannel.

After receiving the beamforming signal, the STAs 701, 702, and 703 transmit the determination result, which is information about a subchannel index having an optimal channel station, to the BS 700. The BS 700 receives BR from the STAs 701, 702, and 703 and decides each direction to the STAs 701, 702, and 703 using the received BRs.

The BS 700 transmits data by applying different beamforming weights as the decided direction to different data which will be transmitted to the STAs 701, 702, and 703. If all of the STAs 701, 702, and 703 are located at the decided direction, the BS 700 divides a beamforming weight as the decided direction by subchannels allocated to a sector divided through spatial multiplexing based on the BS 700.

When a plurality of STAs 701, 702, and 703 transmit the BRs at the same time to the BS 700, the reception rate of the BS 700 may be decreased due to collision between the BRs. Accordingly, the STAs 701, 702, and 703 transmit the BRs after a final back off time (Back off time). Since the process of calculating the final back off time (Back off time) was already described with reference to Eq. 1, Eq. 2, and Eq. 3, the detail description thereof is omitted herein.

Figures 8A, 8B:
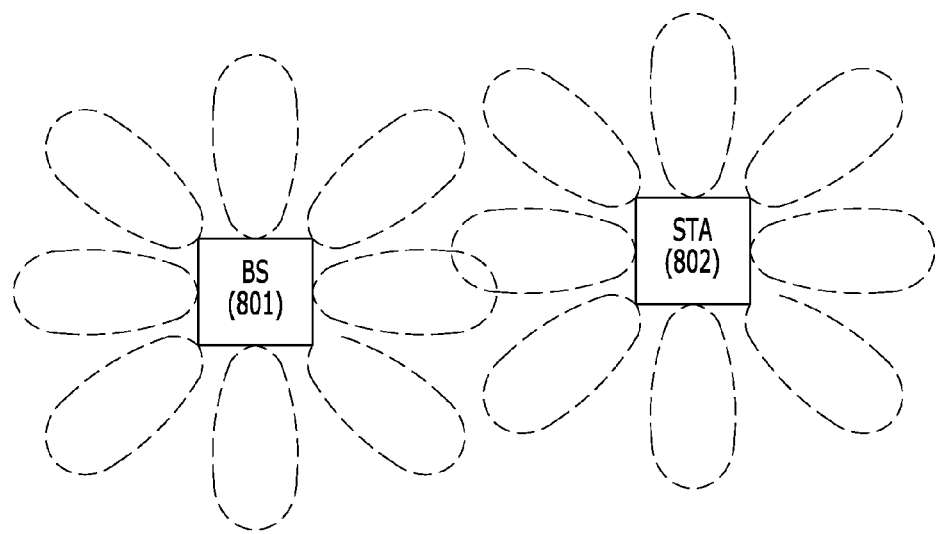
FIGS. 8A and 8B are a diagram illustrating grouping a plurality of subchannels in a base station and transmitting data in different directions from the base station to a station in a wireless communication system in accordance with an embodiment of the present invention.

FIGS. 8A and 8B are a diagram illustrating grouping a plurality of subchannels in a BS and transmitting data in different directions from the BS to an STA in a wireless communication system in accordance with an embodiment of the present invention.

Referring to FIGS. 8A and 8B, the BS 801 and the STA 802 include a plurality of antennas. The BS 801 regularly transmits a sensing signal to the STA 802 in order to maintain connection to the STA 802. The STA 802 transmits information about a wireless channel to the BS 801 and about itself to the BS 801 using the sensing signal. The sensing signal may be included in a predetermined part of a packet transmitted from the BS 801 and transmitted to the STA 802.

The BS 801 transmits a packet to the STA 802. A beamforming signal included in the packet is training information for all frequencies, which the STA 802 is already aware of. Accordingly, the STA 802 can determine which channel frequency has an excellent state by comparing the training information included in the beamforming signal and not beamformed training information.

After receiving the beamforming signal, the STA 802 transmits the determination result, which is information about a subchannel index having an optimal channel state, to the BS 801. After receiving information about the subchannel information having the optimal channel state, the BS 801 groups subchannels and may transmit data through different directions.

The BS 801 may group the subchannels by two-subchannels 802 or by four-subchannels 804. The BS 801 may group the subchannels randomly 805. Then, the BS 801 allocates the same data to each one of the grouped subchannels and transmits the same data through different directions. For example, the BS 801 groups eight subchannels by two-subchannels, for example, to subchannel groups A to D. Then, the BS 801 allocates the same data to each one of the subchannel groups A to D.

The BS 801 transmits data to different directions A to D according to the subchannel groups A to D. A process of grouping the subchannels by four 804 or randomly 805 and transmitting data to the STA in the BS 801 is identical to the above described process. Accordingly, the detail descriptions thereof are omitted herein. The above described data transmission is performed after establishing association between a BS and a plurality of STAs in a BS-STA mode.

However, if the association process repeats for transmitting data between the BS and the STAs, overall time and resources will be wasted. Accordingly, a data transmission/reception period between the BS and the STA is divided into a beacon period and a data period in order to overcome the time and resource wasting problem. Hereinafter, a data transmission process by dividing a data transmission/reception period into a beacon period and a data period in a wireless communication system in accordance with an embodiment of the present invention will be described with reference to FIGS. 9 and 10.

Figure 9:
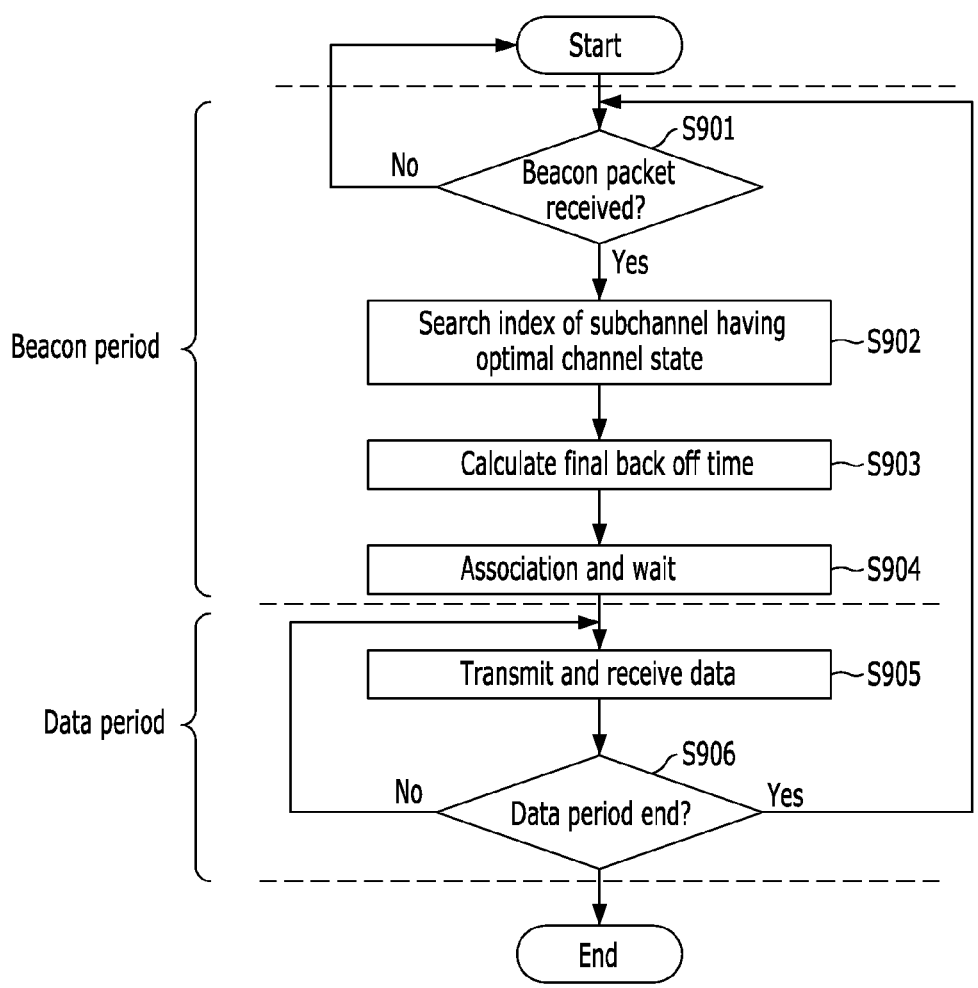
FIG. 9 is a flowchart illustrating a method for transmitting and receiving data in a station by dividing a data transmission/reception period into a beacon period and a data period in a wireless communication system in accordance with an embodiment of the present invention.

FIG. 9 is a flowchart illustrating a method for transmitting and receiving data in a STA by dividing a data transmission/reception period into a beacon period and a data period in a wireless communication system in accordance with an embodiment of the present invention.

Referring to FIG. 9, the data reception period includes a beacon period and a data period. The beacon period includes receiving a BC from at least one of a plurality of BSs in a wireless network having a plurality of STAs at step S901, searching an index of a subchannel having an optimal channel station using the received BC at step S902, calculating a final back off time (Back off time) at step S903, and performing association between the BS and the STAs and waiting for receiving data at step S904. The data period includes transmitting and receiving data at step S905.

In more detail, when the receiving unit 211 receives a BC from at least one of the plurality of BSs in a wireless network including a plurality of STAs at step S901, the step S901 is performed. If the receiving unit 211 does not receive a BC at the step S901, the receiving unit 211 returns to an initial state and receives a BC from the BS again.

The BC includes types A to C. However, the BC may include other type of packets in addition to the types A to C. The types A to C may include a TFI field, a TF2 field, a TF3 field, a SIG field, and a DATA field. The TF2 field includes a first training symbol, and the TF3 field stores a second training symbol.

The first training symbol is a symbol transmitted to omni-directions without applying different beamforming weights to subchannels allocated to the plurality of sectors. The second training symbol is a symbol transmitted to a predetermined direction by applying different beamforming weight to each subchannel allocated to the plurality of sectors.

The SIG field stores information related to the training symbols stored in the TF2 and TF3 fields, and information about a modulation scheme and a length of data stored in the DATA field. The DATA field stores all information transmitted from upper layers of a physical layer and a MAC layer.

At step S902, the searching unit 212 searches an index of a subchannel having an optimal channel state using the received BC among subchannels allocated to a sector for spatial multiplexing based on the BS. Particularly, the searching unit 212 extracts channel states of subchannels without different weights applied using the first training symbol and extracts channel states of subchannels with different weights applied using the second training symbol.

The searching unit 212 compares the extracted channel states and searches a subchannel index having an optimal channel state using a signal intensity of a signal received through each subchannel. The calculating unit 213 calculates a final back off time (Back off time) using a sector back off time (Backoff_sec) corresponding to the subchannel index and a random back off time (Backoff_rad) randomly generated by the STA at step S903. The transmitting unit 214 associates with the BS according to the final back off time.

At step S905, the receiving unit 211 transmits and receives data from the BS. At step S906, the receiving unit 211 determines whether the data period ends or not. If the data period ends, it returns to a start point. If not, the receiving unit 211 transmits and receives data again in the step S905. Here, when beamforming directions from the BS to the plurality of STAs are different, data may be grouped together and transmitted. On the contrary, different data is transmitted at the same from each STA to the BS.

Figure 10:
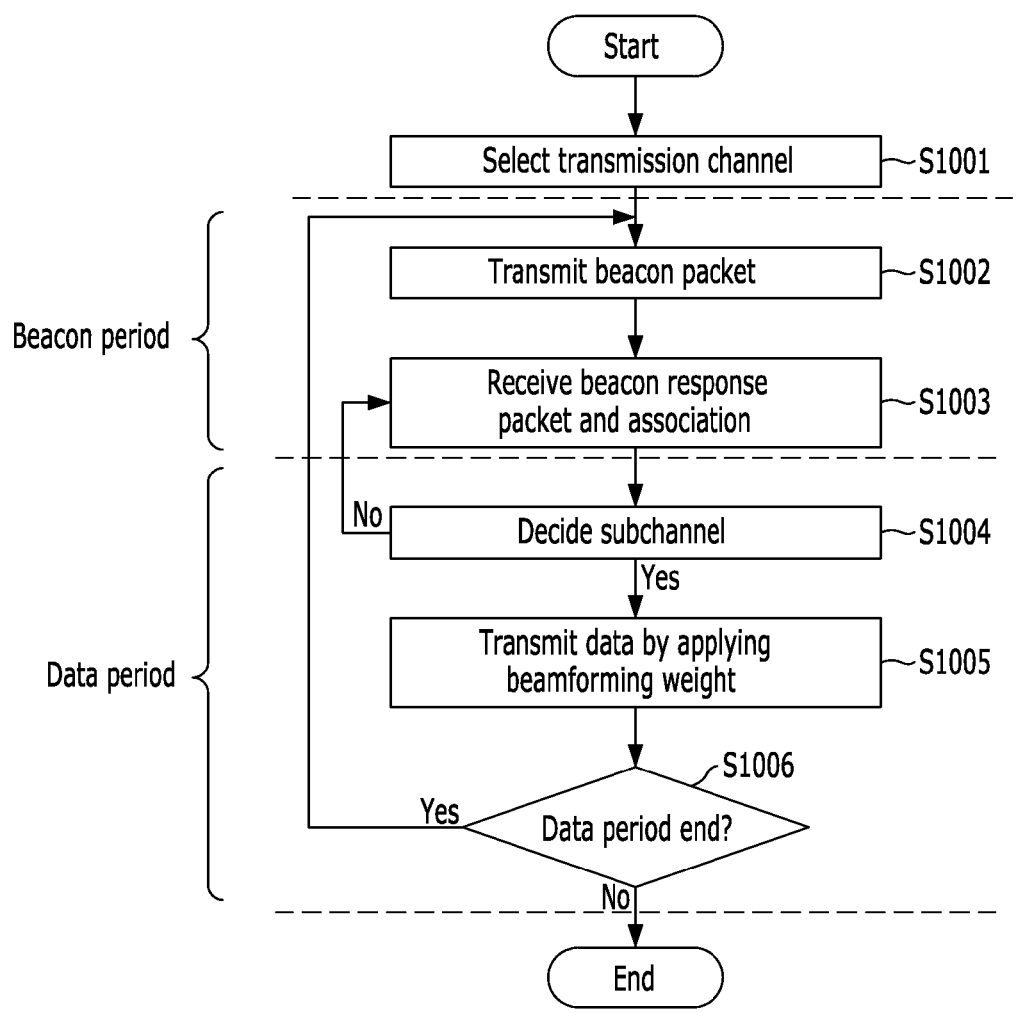
FIG. 10 is a flowchart illustrating a method for transmitting and receiving data in a base station by dividing a data transmission/reception period into a beacon period and a data period in a wireless communication system in accordance with an embodiment of the present invention.

FIG. 10 is a flowchart illustrating a method for transmitting and receiving data in a BS by dividing a data transmission/reception period into a beacon period and a data period in a wireless communication system in accordance with an embodiment of the present invention.

Referring to FIG. 10, the data transmission period includes a beacon period and a data period. The beacon period includes transmitting a BC at step S1002 and receiving a BR and establishing association between the BS and the STA at step S1003. The data period includes deciding a subchannel using the beacon response message at step S1004 and transmitting data using the decided subchannel by applying a beamforming weight to an optimal direction for all OFDM subchannels for data to be transmitted at step S1005.

In more detail, the BS selects a transmission channel at step S1001 and transmits a BC to at least one of a plurality of STAs in a wireless network having a plurality of BSs at step S1002. The BS receives a BR from the STA and associates with the STA at step S1003.

The receiving unit 411 of the BS decides a subchannel to be used for transmission from subchannels allocated to a sector divided through spatial multiplexing based on the BS at step S1004. Then, the weight unit 413 applies a beamforming weight to an optimal direction for all OFDM subchannels for data to be transmitted, loads the data on the subchannel with the beamforming weight applied, and transmits the data to the STA at step S1005. The transmitting unit 414 determines whether the data period end or not at step S1006. When the data period ends, it returns to the step S1002. If not, data is transmitted and received at the step S1004. Hereinafter, a method for transmitting and receiving data by dividing a data transmission/reception period into a beacon period and a data period in a wireless communication system in accordance with an embodiment of the present invention will be described with reference to FIG. 11.

FIG. 11 is a diagram illustrating a method for transmitting and receiving data by dividing a data transmission/reception period into a beacon period and a data period in a wireless communication system in accordance with an embodiment of the present invention.

The data transmission/reception period includes a beacon period 1103 and 1105 and a data period 1104 and 1106. In the beacon period 1103, a BS transmits a BC to STA1 and STA2. The STA1 and STA2 receive the BC from the BS. Using the BC, the STA1 and STA2 search an index of a subchannel having an optimal channel state among subchannels allocated to a sector divided through spatial multiplexing based on the BS. The STA1 and STA2 calculate final back off times (Back off time) 1101 and 1102 using a sector back off time (Backoff_sec) corresponding to the index of the subchannel and a random back off time (Backoff_rad) randomly generated by the STA1 and STA2.

The STA1 transmits a BR to the BS after the final back off time 1101, and the STA2 transmits a BR to the BS after the final back off time 1102. Accordingly, it is possible to prevent the BRs transmitted from the STA1 and STA2 from collision by transmitting the BRs after different final back off times.

After the BS receives the BRs from the STA1 and STA2 as described above, the BS respectively associates with the STA1 and STA2.

Then, the BS decides a subchannel to be used for transmission from subchannels allocated to a sector divided through spatial multiplexing based on the BS using the received BRs from the STA1 and STA2 in the data period. The BS applies a beamforming weight to an optimal direction for all OFDM subchannels, loads the data on the beamforming weight applied subchannel, and transmits the data. Further, the STA1 and STA2 may individually transmit different data to the BS. Or, the STA1 and STA2 may transmit different data to the BS at the same time.

If the data period 1104 does not end, data transmission and reception between the BS and the STA1 and STA2 are continued. After the data period 1104 ends, a beacon period 1105 starts. Since the beacon period 1105 and the data period 1106 are identical the beacon period 1103 and the data period 1104, the detail descriptions thereof are omitted herein.

In the embodiments of the present invention, data can be transmitted and receive using an antenna having an optimal channel environment among a plurality of antennas in a MIMO antenna system. Further, data can be transmitted and received at a high transmit rate by deciding a transmission/reception direction using an index of a subchannel having an optimal channel environment among a plurality of antennas in a MIMO system in accordance with an embodiment of the present invention.

While the present invention has been described with respect to the specific embodiments, it will be apparent to those skilled in the art that various changes and modifications may be made without departing from the spirit and scope of the invention as defined in the following claims.

What is claimed is:

1. An apparatus for receiving data, comprising:
a receiving unit configured to receive a beacon packet from at least one of a plurality of base stations included in a wireless network having a plurality of stations;
a searching unit configured to search for an index of a subchannel including an optimal channel state among subchannels allocated to a plurality of sectors determined through spatial multiplexing based on the at least one base station using the beacon packet;
a calculating unit configured to calculate a final back off time by adding a random time to a slot time corresponding to the index of the subchannel, the random time being generated randomly; and
a transmitting unit configured to include information about the index of the subchannel in a beacon response packet and transmit the beacon response packet after the final back off time.

2. The apparatus of claim 1, wherein the beacon packet includes information about a first training symbol, a second training symbol, and data.

3. The apparatus of claim 2, wherein the first training symbol is a symbol transmitted in omni-directions without different beamforming weights applied to the subchannels allocated to the plurality of sectors.

4. The apparatus of claim 2, wherein the second training symbol is a symbol transmitted in a predetermined direction with different beamforming weights applied to the subchannels allocated to the plurality of sectors.

5. The apparatus of claim 2, wherein the searching unit is configured to compare a beamforming weight applied channel state with a beamforming weight not applied channel state using the first and second training symbols.

6. The apparatus of claim 1, wherein the calculating unit randomly generates an integer number not greater than a predetermined maximum value and calculates the final back off time using a slot time corresponding to the generated integer number.

7. An apparatus for transmitting data, comprising:
a receiving unit configured to receive beacon response packets from a plurality of stations in a wireless network having a plurality of base stations;
a deciding unit configured to decide directions of the plurality of stations using the received beacon response packets;
a weight unit configured to apply beamforming weights in the decided directions to subchannels allocated to a plurality of sectors determined through spatial multiplexing;
a transmitting unit configured to load data on the weight applied subchannels and transmit the data to the plurality of stations in the decided directions,
wherein the receiving unit receives the beacon response packets respectively from the plurality of stations after final back off times corresponding to the plurality of stations, and each of the final back off times is acquired by adding a random time to a slot time corresponding to an index of one of the subchannels.

8. The apparatus of claim 7, wherein each of the beacon response packets includes information about the index of the one subchannel, the one subchannel having an optimal channel state.

9. The apparatus of claim 7, wherein, if one station is located in each of the decided directions, the weight unit applies a beamforming weight to subchannels of a sector for transmitting data to said station in each of the decided directions.

10. The apparatus of claim 7, wherein, if plural stations are located in one of the decided directions, the weight unit applies beamforming weights to corresponding subchannels of a sector for transmitting data to the plural stations.

11. The apparatus of claim 7, wherein the weight unit applies different beamforming weights to different data to be transmitted to the plurality of stations.

12. A method for receiving data, comprising:
receiving a beacon packet from at least one of a plurality of base stations in a wireless network having a plurality of stations;
searching for an index of a subchannel having an optimal state among subchannels allocated to a sector determined through spatial multiplexing based on the at least one base station using the beacon packet;
calculating a final back off time by adding a slot time corresponding to the index of the subchannel and a random time randomly generated; and
including information about the index of the subchannel in a beacon response packet and transmitting the beacon response packet after the final back off time.

13. The method of claim 12, wherein the beacon packet includes a first training symbol, a second training symbol, and data information.

14. The method of claim 13, wherein searching for the index comprises comparing a beamforming weight applied channel state with a beamforming weight not applied channel state using the first and second training symbols.

15. The method of claim 12, wherein calculating the final back off time comprises:
randomly generating an integer number not greater than a predetermined maximum value; and calculating the final back off time using a slot time corresponding to the generated integer number.

16. A method for transmitting data, comprising:
transmitting a beacon packet to a plurality of stations;
receiving beacon response packets from the plurality of stations in a wireless network having a plurality of base stations;
deciding directions to the plurality of stations using the received beacon response packets;
applying beamforming weights in the decided directions to subchannels allocated to a plurality of sectors determined through spatial multiplexing; and
loading data on the weight applied subchannels and transmitting the data to the at least one station in the decided directions,
wherein the beacon response packets are respectively received from the plurality of stations after final back off times corresponding to the plurality of stations, and each of the final back off times is acquired by adding a random time to a slot time corresponding to an index of one of the subchannels.

17. The method of claim 16, wherein each of the beacon response packets includes information about the index of the one subchannel, the one subchannel having an optimal channel state.

18. The method of claim 16, wherein in applying the beamforming weights,
if one station is located in each of the decided directions, a beamforming weight is applied to subchannels of a sector for transmitting data to said station in each of the decided directions.

19. The method of claim 16, wherein in applying the beamforming weights,
if plural stations are located in one of the decided directions, beamforming weights are applied to corresponding subchannels of a sector for transmitting data to the plural stations.

20. The method of claim 16, wherein applying the beamforming weights comprises
applying different beamforming weights to different data to be transmitted to the plurality of stations.

* * * * *